US010389782B2

(12) United States Patent
Alsina et al.

(10) Patent No.: US 10,389,782 B2
(45) Date of Patent: Aug. 20, 2019

(54) SYNCHRONIZED PLAYBACK OF ALTERNATE CONTENT VERSION

(71) Applicant: Apple Inc., Cupertino, CA (US)

(72) Inventors: Thomas Alsina, Mountain View, CA (US); Arvind S. Shenoy, San Jose, CA (US); Gregory R. Chapman, San Jose, CA (US); James D. Batson, Sunnyvale, CA (US); Nicholas J. Paulson, San Francisco, CA (US); Simon Goldrei, San Francisco, CA (US); Szu-Wen Huang, Fremont, CA (US)

(73) Assignee: Apple Inc., Cupertino, CA (US)

( * ) Notice: Subject to any disclaimer, the term of this patent is extended or adjusted under 35 U.S.C. 154(b) by 356 days.

(21) Appl. No.: 15/056,758

(22) Filed: Feb. 29, 2016

(65) Prior Publication Data

US 2017/0093943 A1 Mar. 30, 2017

Related U.S. Application Data

(60) Provisional application No. 62/235,536, filed on Sep. 30, 2015.

(51) Int. Cl.
*G06F 17/28* (2006.01)
*H04L 29/06* (2006.01)
*H04L 29/08* (2006.01)
*G06F 16/683* (2019.01)

(52) U.S. Cl.
CPC ............ *H04L 65/60* (2013.01); *G06F 16/685* (2019.01); *G06F 17/289* (2013.01); *H04L 65/1083* (2013.01); *H04L 65/4015* (2013.01); *H04L 67/1095* (2013.01); *H04L 67/26* (2013.01)

(58) Field of Classification Search
CPC ........................................................ H04L 65/60
USPC ........................................................ 709/219
See application file for complete search history.

(56) References Cited

U.S. PATENT DOCUMENTS

| 6,985,966 | B1 | 1/2006 | Gupta et al. |
| 7,236,739 | B2 | 6/2007 | Chang |
| 7,627,808 | B2 | 12/2009 | Blank et al. |
| 7,669,219 | B2 | 2/2010 | Scott, III |
| 8,079,044 | B1 | 12/2011 | Craner |
| 8,161,111 | B2 | 4/2012 | Espelien |
| 8,316,154 | B2 | 11/2012 | Yoneda |
| 8,364,296 | B2 | 1/2013 | Wilhelm |
| 8,457,770 | B1 | 6/2013 | Martin et al. |
| 8,639,085 | B2 | 1/2014 | Pejaver |

(Continued)

OTHER PUBLICATIONS

Speakerfy free by Optini LLC, "iTunes is the world's easiest way to organize and add to your digital media collection." Updated May 1, 2013. 3 pages.

*Primary Examiner* — David R Lazaro
*Assistant Examiner* — Zia Khurshid
(74) *Attorney, Agent, or Firm* — Kilpatrick Townsend & Stockton

(57) ABSTRACT

Users can share a content stream and can create and/or edit playlists that include content items of the content stream. Each user device, or a subset of the user devices, can edit the playback commands of the content stream once it is being shared. Playback of the content items is synchronized between the sharing devices. If one device is associated with a content restriction, an alternate version may be provided to that device. The two versions can still be played synchronously with one another.

21 Claims, 8 Drawing Sheets

(56) References Cited

U.S. PATENT DOCUMENTS

| | | |
|---|---|---|
| 8,719,349 B2 | 5/2014 | Lockhart et al. |
| 8,719,881 B2 | 5/2014 | Riedl et al. |
| 8,990,303 B2 | 3/2015 | Wong et al. |
| 2005/0286546 A1 | 12/2005 | Bassoli et al. |
| 2008/0209021 A1 | 8/2008 | Shamma |
| 2009/0249222 A1* | 10/2009 | Schmidt ............ H04N 21/2368 715/751 |
| 2011/0218656 A1 | 9/2011 | Bishop et al. |
| 2012/0230653 A1* | 9/2012 | Redmann ................ A63J 25/00 386/241 |
| 2013/0347022 A1 | 12/2013 | Bates et al. |
| 2014/0096169 A1 | 3/2014 | Dodson et al. |

* cited by examiner

SYNCHRONIZED PLAYBACK OF ALTERNATE CONTENT VERSION

CROSS-REFERENCE TO RELATED APPLICATIONS

This application claims the benefit of and priority to U.S. Provisional Application No. 62/235,536, filed Sep. 30, 2015, the entire contents of which is incorporated herein by reference for all purposes. Additionally, this application is related to the following U.S. Patent Applications, each filed Sep. 30, 2015: application Ser. No. 14/871,989, entitled "SHARED CONTENT PRESENTATION WITH INTEGRATED MESSAGING," application Ser. No. 14/871,839, entitled "EARBUD SHARING," application Ser. No. 14/871,842, entitled "MUSIC EVERYWHERE," application Ser. No. 62/235,407, entitled "CLOCK SYNCHRONIZATION TECHNIQUES INCLUDING MODIFICATION OF SAMPLE RATE CONVERSION," and application Ser. No. 14/871,879, entitled "SYNCHRONIZATION OF MEDIA RENDERING IN HETEROGENEOUS NETWORKING ENVIRONMENTS," which are each herein incorporated by reference in their entirety for all purposes.

BACKGROUND

This disclosure relates generally to sharing of content streams between or among multiple user devices and in particular to shared content presentations with alternate version capability.

People love to consume media. With the advance of technology, a great deal of media content (including songs, albums, videos, books, etc.) is now available in digital form. By interacting with online services, consumers can purchase digital media content items, typically in the form of computer-readable data files containing a representation of media content that the consumers' electronic devices can use to render tangible outputs such as images and/or sounds (referred to as playing the content). More recently, the advent of broadband Internet connectivity has led to the development of "streaming" media services that can provide media content items to users' devices on a temporary basis, often in real time (e.g., the rate of data delivery to the user's device can keep up with the rate at which the user's device renders tangible outputs from the data). In general, a "streamed" media content item either is not stored on the user device or is stored only briefly, e.g., in a buffer, to support rendering operations on the user's device. This can allow users to consume media content without being limited by the storage capacity of their devices, often at lower cost than purchasing content items. Some streaming media services may also allow users to temporarily download media content items for offline consumption and/or to purchase media content items for long-term storage on the users' devices.

SUMMARY

In addition to streaming media, users also love to share their experiences. For example, a user listening to streamed music may want her friends to hear it as well. If the users are not in the same place, they can use various shared streaming tools to stream the same content to multiple devices, including devices belonging to different users, so that all users can receive and experience the content at the same time or at least approximately at the same time (e.g., synchronously). A playlist may include a set (list) of media content to be streamed sequentially, that can be curated or formed by users.

While experiencing shared content, the users may want to share entire playlists, and provide the other streaming users with editable rights (privileges) to revise the playlist and/or control the playback of individual streaming content items of the playlist. Certain embodiments of the present disclosure relate to devices, user interfaces, and methods that can facilitate experiencing a shared content stream, sharing associated playlists, and/or enabling the substitution of alternate versions of content items or editing of content items to make alternate versions (while still maintaining synchronous playback of the shared content stream).

For example, a server may receive a dynamic playlist from a user and store the playlist of content on the server. In response to a request to synchronize/share the playlist, an offer could be sent to another device (this offer could also be peer-to-peer instead of coming from the server). If the other device accepts, the server would be responsible for syncing playback to both devices. The syncing of playback includes enabling either device (or multiple devices) to revise (e.g., add/delete/reorder) the playlist and/or control playback (e.g., play/pause/skip) of the content (e.g., songs) of the playlist. The server can maintain state of the playback, including providing commands to the clients, streaming the content, and calculating appropriate buffer times. The commands can include a global start time for each track that uses the calculated buffer times so that the client knows exactly when to start each track, and if that time is missed, how much of the song to skip so that it will begin playing the song at a time that is synchronized with the other client(s).

The server can also provide different rights to different users. The server can provide push notifications for command and request communications (e.g., to handle scrubbing and fast forward type commands). Proximate peers may be used to reroute commands and/or stream content using local area connections. In some examples, a playlist creator (curator) may be able to edit a playlist to include local, live, or other curated content, and the playlist could be shared with many (e.g., hundreds or thousands of) listeners. Age and/or explicit content restrictions may be handled by editing or converting alternate versions of content so that they can maintain synchronous play with the original versions. Persistent "virtual rooms" may be created that enable the continued playing of content even when no one is listening.

In some aspects, a client device may create a playlist and provide it to the server. The client or server could send a request to share the playlist (or accept if from a non-initiating client). The client(s) could edit the playlist and/or control playback of the songs. The client would be able to receive a command from the server and determine whether to start playing a track at the beginning (or start point—which may not be the beginning of the song) or to skip ahead to meet the global clock start time. However, in some cases, the server may only provide the start time (global clock time), and leave it up to each client to meet the start deadline. Yet still, if the clients are playing a single stream containing multiple songs (e.g., a radio-type broadcast), the server might use song transitions to provide instructions for resynchronizing playback. This instruction could then contain both the start time as well as an offset into the stream that should be played at the instructed time. In some examples, the client device may also determine when its own clock is not the same as the global clock and change the playback speed of the content in the playlist to maintain the synchronicity with the server and/or the other sharing devices. The client device may also provide connection information to the server to help the server calculate buffer times. The client device may also enable joining synced content in the middle of playback.

Certain embodiments relate to graphical user interfaces for a user device. In some embodiments, a first portion of a graphical user interface (e.g., a region within a display area devoted to the graphical user interface) can provide various content controls the user can operate to interact with a shared content stream being received and presented at the user device, such as controls to play and pause the stream, to select content items to be streamed, and/or to invite other users to share the stream. A second portion of the graphical user interface (e.g., a second region within the display area devoted to the graphical user interface) can provide visual content associated with the shared stream (e.g., an album cover associated with the shared content, a video associated with the shared content, an image provided by one of the users, etc.).

Certain embodiments relate to methods wherein a first user device can receive a shared content stream that is shared with one or more other user devices. The first user device can present the shared content stream to the user. In some instances, a graphical user interface can be displayed while the content is presented. This interface can include information from the shared content stream (e.g., information identifying the content being played, a visual component of the content if applicable). The first device can send an offer (e.g., to share the playlist/experience) to the users of the one or more other devices. If the first user device receives an indication that any of the offers are accepted, a server computer may manage streaming the content items to both devices.

The following detailed description together with the accompanying drawings will provide a better understanding of the nature and advantages of the present disclosure.

DETAILED DESCRIPTION

Certain embodiments of the present disclosure relate to devices, user interfaces, and methods to synchronize presentation of various versions of content in a playlist (e.g., a content stream), allowing users who are experiencing a shared content stream maintain synchronization with one another even when different versions of a particular content item are different. Examples are described with reference to streaming of music and other media content in operating environments where users can select existing content items to be streamed and can control the stream itself with playback control commands (e.g., pause and resume playback, fast forward, rewind, etc.) but generally do not modify the underlying content item or propagate any modifications to other devices; streaming as used herein can be understood as a one-way data transfer that can be directed by the user(s). However, those skilled in the art will appreciate that the techniques described herein can also be adapted for application in contexts that do involve two-way data transfer, such as collaborative editing of a document or other content item.

System Overview

Figure 1:
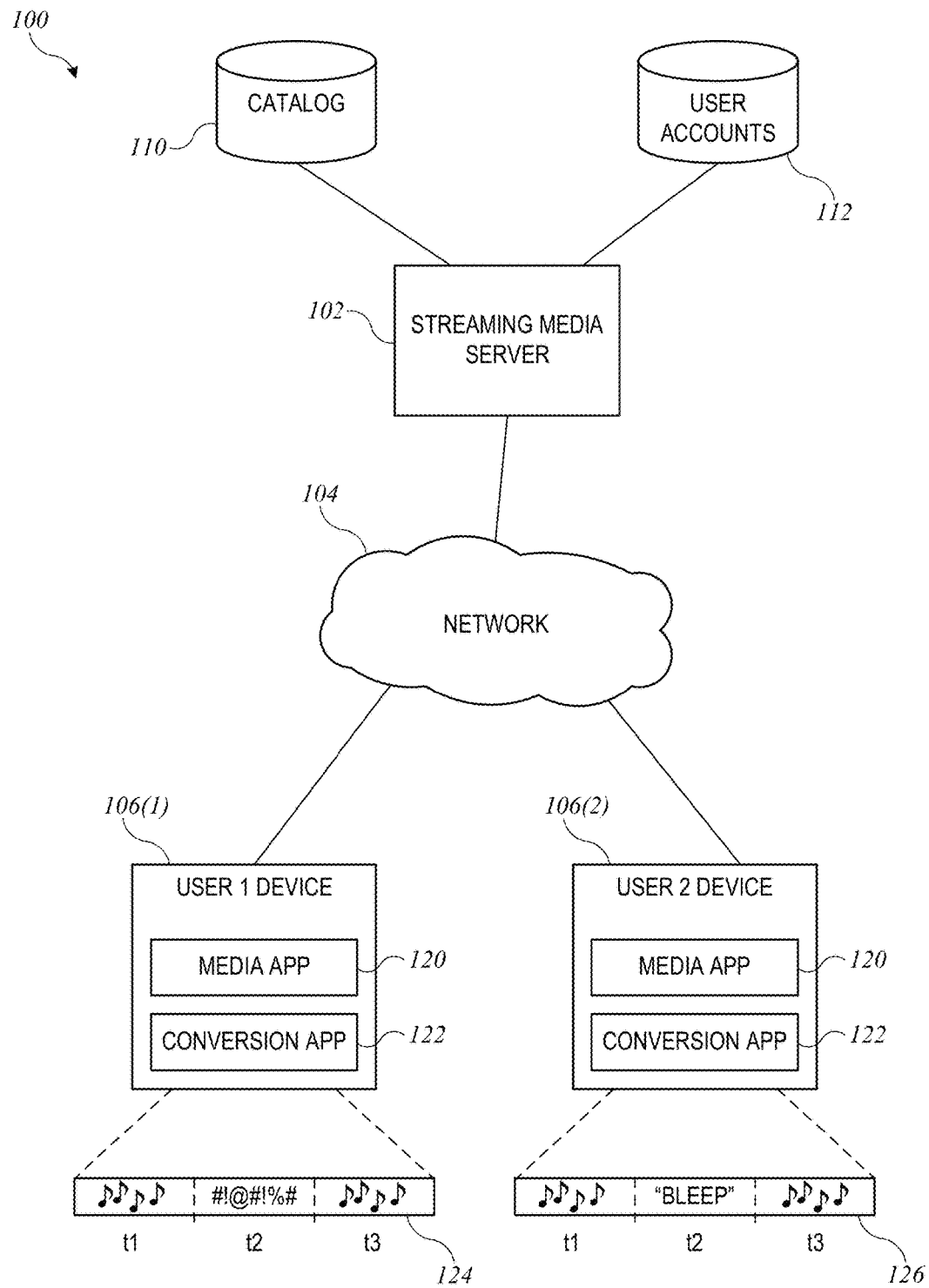
FIG. 1 shows an example of a media delivery system according to an embodiment of the present disclosure.

FIG. 1 shows an example of a media delivery system 100 according to an embodiment of the present disclosure. Media delivery system 100 can include streaming media server 102 communicably connected to network 104 (e.g., the Internet). User devices 106 can also connect to network 104 and can connect to server 102 via network 104.

Streaming media server 102 can be implemented as a computer system or an interconnected set of computer systems (e.g., a server farm or multiple server farms, elements of which can be geographically dispersed as desired). Streaming media server 102 can have access to a catalog repository 110, which can store media content items that can be streamed or otherwise delivered to user devices 106. Catalog repository 110 can be implemented using large-scale data storage and retrieval technologies and can include a collection of media content items (which can be stored as computer-readable data files containing a representation of media content) as well as an index to the collection. The index can be, e.g., a database or other structured data store that associates various items of metadata descriptive of each media content item (which can include any data descriptive of the content item or some aspect thereof) with a reference to the location where the content item is stored. The index can be used to facilitate searching and browsing of media content items stored in catalog repository 110. For example, metadata for a media content item can include a track title (e.g., song title, book title, video title), artist information (e.g., name of a band or individual performer that created the content item), album information (e.g., if the media content item is part of an album), track information (e.g., if the media content item incorporates a collection of related content items, sometimes referred to as "tracks," such as the individual songs on an album), date of creation of the content, genre information, and so on. A particular storage configuration or indexing scheme is not required.

Streaming media server 102 can also have access to user account information repository 112, which can store information about user accounts for a streaming media service. User account information repository 112 can be implemented using large-scale data storage and retrieval technologies and can include, e.g., a database of user account records pertaining to accounts established by users with the streaming media service. For example, a user operating user device 106(1) (or user device 106(2)) can communicate with streaming media server 102 to establish an account. Establishing an account can include defining a username (or "user ID") and password that can be used to identify and authenticate a particular user. Additional user account information can be collected, e.g., by express user input or automatically based on interactions between user device 106(1) and streaming media server 102. Examples of user account information can include subscription and payment information (e.g., whether the user is a subscriber and whether applicable subscription fees have been paid), contact information (e.g., email address, phone number, mailing address), demographic information (e.g., age, gender, location, etc.), media consumption history, and so on.

User devices 106 can belong to users of the streaming media service operating through streaming media server 102. Different instances of user device 106 can belong to different users, and in some instances a single user can have multiple devices 106. User devices 106 can include various user-operable computing devices, such as a smart phone, a tablet computer, a desktop or laptop computer, a wearable computing device, or the like. In some embodiments, the provider of the streaming media service can provide a media application program 120 (also referred to as a "media app") that, when executed on user device 106, enables user device 106 to interact with streaming media server 102 to browse catalog repository 110, search catalog repository 110, and stream selected media content items from catalog repository 110 to user device 106. Accordingly, media app 120 can provide user account credentials (e.g., username and password) to streaming media server 102, allowing streaming media server 102 to retrieve user account information from user account information storage 112 and to customize the experience for a particular user. It is to be understood that a user can access the same user account on streaming media server 102 using different user devices 106.

Media app 120 can also enable creation, storing (e.g., for later use), and/or editing of one or more playlists of content items from catalog 110. A playlist may be a sequential list (queue) of content items, intended (or selected) to be presented by and/or streamed to media app 120 by streaming media server 102. In some examples, a playlist may include pre-recorded content items (e.g., songs, video, etc.) and/or live streams of content. A playlist may be configured to instruct media app 120 regarding which content items to play and when, and may include the metadata about each content item. By default, the playlist may instruct the media app to play each content item in sequential order, from start to finish, and/or with each new content item being started just after the previous content item ends. In this way, a user can create a list of songs to be played for an event or time frame, and know exactly what content items will be played once media app 120 begins playing the playlist.

User devices 106 can also store and execute other application programs, such as conversion app 122. Conversion app 122 can include any software that is operable to convert a first (e.g., original) version of a content item into a second version. For example, an audio editing application may be configured to alter version 124 of a content item into version 126, so that it version 126 can still be synchronized with (un-altered) version 124. Specific apps and supported services are referenced herein as examples; other apps and services can also be used. In embodiments described herein, conversion app 122 can interact with media app 120 to provide alternate versions of content items that can be integrated with streaming media experiences delivered via media app 120. For example, version 124 may include explicit lyrics at t2, while alternate version 126 may instead include (e.g., after being altered or otherwise converted) "bleep" at t2. Examples of such operations are described below. However, in other examples, the alternate version of content items may be already recorded (e.g., no conversion is required) or may be converted by streaming media server 102 or some other service provider (e.g., that may also be accessible over network 104. In some examples, the "bleep" may be tagged by a human curator or a suitable computer algorithm that can detect explicit language. The service may also strip out or replace explicit language in track metadata, such as song title or lyrics.

Depending on implementation, streaming media server 102 can provide a variety of experiences to user device 106 executing media app 120. For example, media app 120 can present a graphical user interface ("GUI") that allows a user to search or browse the media content stored in catalog 110 and/or to generate or edit a playlist. In response to user input received via the GUI, media app 120 can send requests for information to server 102 (e.g., a request to view content by a particular artist, a request to search for content items meeting specific criteria, etc.). Server 102 can respond by providing "page data," which can include instructions and/or information items usable by media app 120 to render another GUI image responsive to the request. In some embodiments, the page data can include image content, text elements, references to locations where various elements (e.g., images or icons) used to render a page can be retrieved, hyperlinks or other references to data storage locations (e.g., locations in catalog repository 110) that can be accessed (or not) based on further user input, and so on. Further, a page (or GUI image) rendered by media app 120 can include user-operable controls to request or control playing of media content items. Accordingly, user devices 106 can each be used to locate and stream media content items via streaming media server 102.

In operation, user device 106 can execute media app 120. Responsive to user input, user device 106 can communicate with streaming media server 102 to identify content to be streamed to user device 106 and to initiate and control streaming of such content. For example, the user can select and play specific content items (e.g., a track or an album). A user can also create, store, and/or edit a playlist of specific content items. A user can also share a content stream (a playlist and/or a one or more individual content items) with one or more other users.

In embodiments described herein, one user device (e.g., user device 106(1)) can also instruct streaming media server 102 to "share" a content stream with one or more other user devices (e.g., user device 106(2)), which can belong to the same user or a different user. Sharing a content stream, as used herein, refers generally to any process by which the same content is delivered from a source (e.g., streaming media server 102) to two or more destination devices (e.g., user devices 106(1) and 106(2)) such that all destination devices can present the content at approximately the same time (subject to differences in transmission time to different destination devices, variations in processing latency between destination devices, and the like). Existing or other techniques for synchronizing content delivery to multiple destination devices can be used in connection with shared content streams.

In some embodiments, shared stream invitations can be forwarded to new users, in which case they'll read something like "Greg is inviting you to listen to Steven's music stream." For example, one of the destination devices can be the "initiator" of content-stream sharing. For instance, a first user can operate user device 106(1) to identify content to be streamed and one or more other user devices (e.g., user device 106(2)) to be invited to share the streamed content. Other user device 106(2) can receive an invitation and can accept or reject the invitation (e.g., based on user input as described below). While a shared content stream is in progress, initiator device 106(1) can provide user-operable control elements that allow the user to control playback of the content stream, which can include, e.g., pausing and resuming playback, skipping ahead to a next track, and/or modifying a queue of upcoming tracks to be played (e.g., adding, removing, or rearranging the tracks in the queue). In some embodiments, some or all of the non-initiator user devices (e.g., user device 106(2)) can also be permitted to share control of playback and/or edit the queue. Those skilled in the art with access to the present disclosure will understand that a specific technology for shared content streaming is not required.

Depending on implementation, streaming media server 102 may also support other streaming services. For example, the operator of streaming media server 102 may allow certain individuals to act as "curators" who can define playlists of media content items; other users can select a playlist and receive the content items contained therein. As another example, streaming media server 102 can support "radio" stations, which can be ongoing streams of media content that a user can select to experience at any time. In various embodiments, radio stations can include "live" streams (e.g., a digitized version of a terrestrial radio broadcast, other live streaming content including content produced exclusively for the streaming media service) and/or algorithmically-generated (and therefore potentially endless) playlists of content items selected by a computer algorithm according to some criterion (e.g., genre, time period, or similarity to a specific "seed" artist selected by a user).

In addition, in some embodiments, streaming media server 102 can provide ancillary services. For instance, a user may be able to bookmark media content items from the catalog. As used herein, "bookmarking" refers generally to a process by which the user provides input indicating that he or she wants to remember a particular content item or make it easy to find again, e.g., through a list of bookmarked items. In some embodiments, when the user bookmarks a media content item, a data record identifying the content item can be added to the user's account information in user account information repository 112. Media app 120 can provide a control operable by the user to access a list of bookmarked content items.

Another ancillary service can be downloading content items for offline listening. In general, it is assumed that streamed content items are not persistently stored on user device 106 (although they may be temporarily stored or buffered in connection with playing of the content). Downloading can allow a content item to be stored for a longer period and to be accessed in situations where user device 106 might not be able to communicate with streaming media server 102 (e.g., when the user is in an airplane or in an area that lacks connectivity to network 104). In various embodiments, downloaded content may be automatically deleted after a specific time (e.g., 24 hours, 48 hours); a user may also be limited as to the number of content items that can be downloaded at any given time and/or how many times a particular downloaded content item can be played. Additionally, in some instances, playlist information and playback controls may be streamed (or otherwise communicated over a network) to user devices 106, while the content itself may be stored locally at each user device 106. In this way, streaming media server 102 may act as more of a facilitator of synchronous playback, as opposed to a service for streaming the media itself. User devices can also stream the audio files among themselves, e.g., whoever enqueued a track can serve the audio file to the other user devices.

Another ancillary service can be purchasing content items. When a content item is purchased, user device 106 can indefinitely store a copy of the content item, e.g., in a local or personal media library. Purchased content items can be played by user device 106 without restriction.

Another ancillary service can be a social posting service, in which certain users (e.g., artists or other curators) can create posts that can be made visible to other users through a dedicated social feed, on a catalog page associated with a particular artist, while content by a particular artist is being played, and so on. Users can interact with posts, e.g., by commenting on the posts, rating the posts, and/or sharing the posts on various social media services (including services that operate independently of the streaming media service).

In some embodiments, streaming media server 102 can restrict access to some or all of its services to users who have paid an access fee (referred to herein as "subscribers"). For example, users who are not subscribers might be permitted to purchase content items but not to bookmark or download content items, and streaming access by non-subscribers can be limited (e.g., a non-subscriber may be permitted to stream only a limited number of content items per month or to stream only a preview portion of any given content item). Additional or different restrictions can also be applied. In some embodiments, access to shared content streaming and associated messaging operations as described below can be limited to subscribers.

It will be appreciated that system 100 is illustrative and that variations and modifications are possible. Any number of user accounts and user devices can be supported. Media content items can include any type of media content (including music, spoken-word, books, video, images, etc.).

In embodiments described herein, media app 120 can support receiving information from streaming media server 102 that instruct user device 106 to present content items of playlists to users at the same time as other user devices present the same content. For example, media app 120 of user device 106(1) may be instructed to play a first content item at a global clock time that is consistent with all other devices in communication with streaming media server 102. Streaming media server 102 may manage or otherwise transmit the global clock time to each user device 106. Further, in some embodiments, media app 120 of user device 106(2) may be instructed to play the same first content item at the same global clock time. Or, if streaming media server 102 is aware that a greater communication latency exists between server 102 and device 106(2) than for 106(1), streaming media server 102 may instruct device 106(2) to start playing the content at a different time. However, often, the start time for the content may always be provided with respect to the global clock, and each device 106 may be responsible for calculating an actual start time and/or an amount of the content to skip (e.g., the device 106 may skip ahead in the track in order to ensure that both devices are synchronized given that one device may receive the play instructions too late to actually start playing at the global clock start time).

In some embodiments, a particular user device 106 may be associated with one or more language restrictions (e.g., via parental or governmental controls) or other policies that might restrict what the user device 106 is configured (or allowed) to play.

FIGS. 2-6 show graphical user interface (GUI) images that can be used for presenting shared content streams (e.g., that are queued in a playlist), including those with alternate versions according to an embodiment of the present disclosure. For purposes of description, all graphical user interface images (also referred to as "pages" or "screens") shown herein are assumed to be presented on a touchscreen display, which allows the user to interact with user-operable control elements by tapping on appropriate areas of the display or performing other touch gestures such as swiping to scroll or the like. Other user interfaces can be substituted, such as "point and click" interfaces where the user operates a pointing device to position a cursor and then clicks a button or makes a specific gesture to indicate a selection. The interface images can be adapted for a particular device, e.g., depending on the size and aspect ratio of the display and/or the available user input devices, and an interface image may occupy all or part of the physical display area of a particular device.

Figure 2:
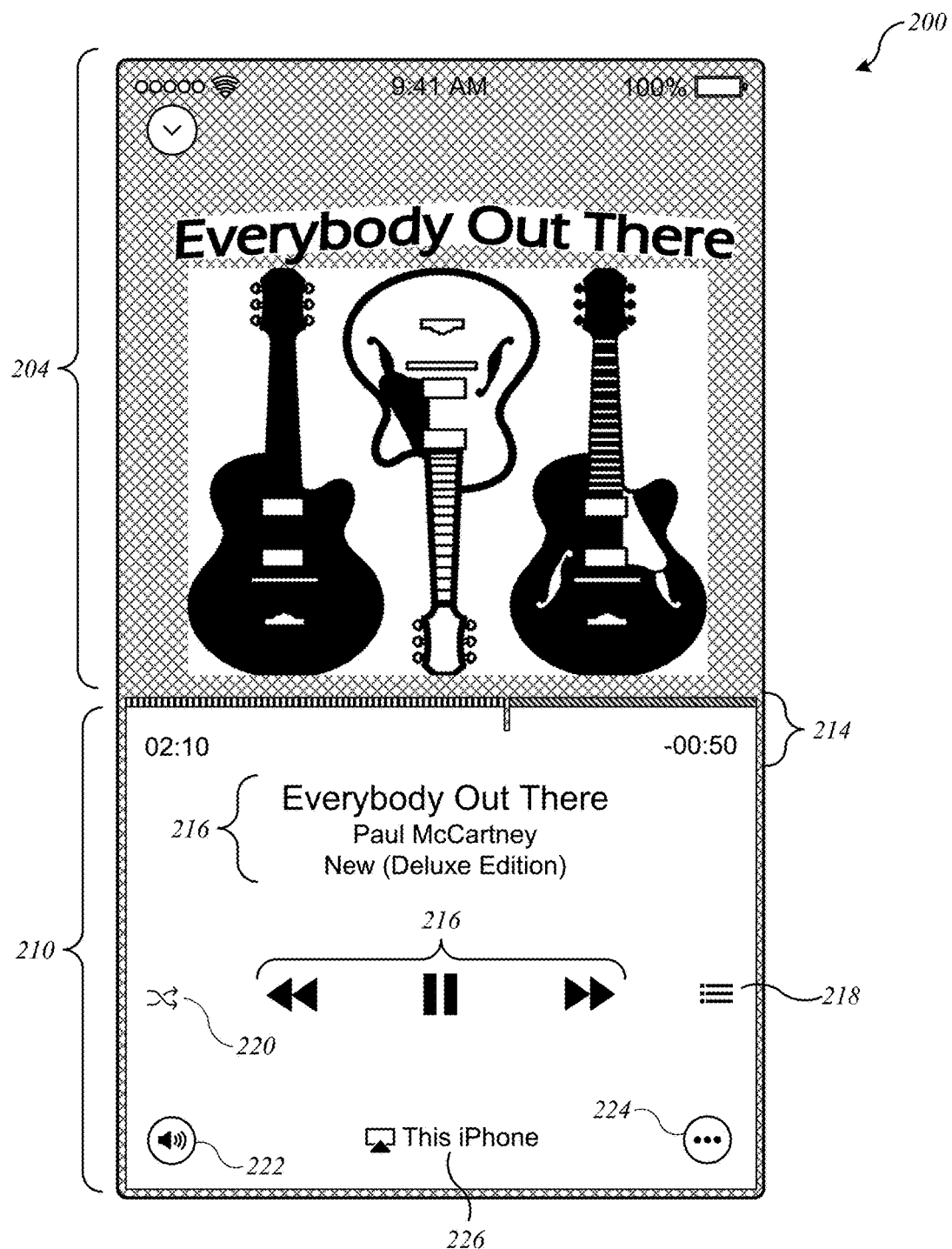
FIG. 2 shows a "now playing" screen according to an embodiment of the present disclosure.

FIG. 2 shows a "now playing" screen 200 according to an embodiment of the present disclosure. Screen 200 can be used to initiate sharing of a content stream. In some embodiments, screen 200 can be presented on a user device (e.g., user device 106(1) of FIG. 1) while the user is receiving streamed content via streaming media server 102. Screen 200 can include image area 204 to display an image (e.g., album artwork) associated with the content item being streamed and control area 210 that can include various user-operable controls to allow the user to interact with the streamed content. For example, control area 210 can include content identifier 212, which in some embodiments can be a selectable control element that allows the user to view additional information about the content item (also referred to as a "track") currently being presented (or played). Progress bar 214 can indicate the current playback position within the track, which can be a time relative to the beginning or end of the track. Playback controls 216 can include controls for pausing and resuming playback, fast forwarding (to a next track or to a later point in the same track), and rewinding (to an earlier point in the same track or to a previous track). List control 218 can allow the user to view and/or modify a list of tracks that are queued for playback (e.g., within a playlist). Shuffle control 220 can allow the user to randomly rearrange the tracks in the queue and/or to define options for repeated playing of tracks. Volume control 222 can be selected to allow the user to make volume adjustments, and "more" control 224 can be selected to access additional options (e.g., downloading, purchasing, or bookmarking the track, and so on).

Figure 3:
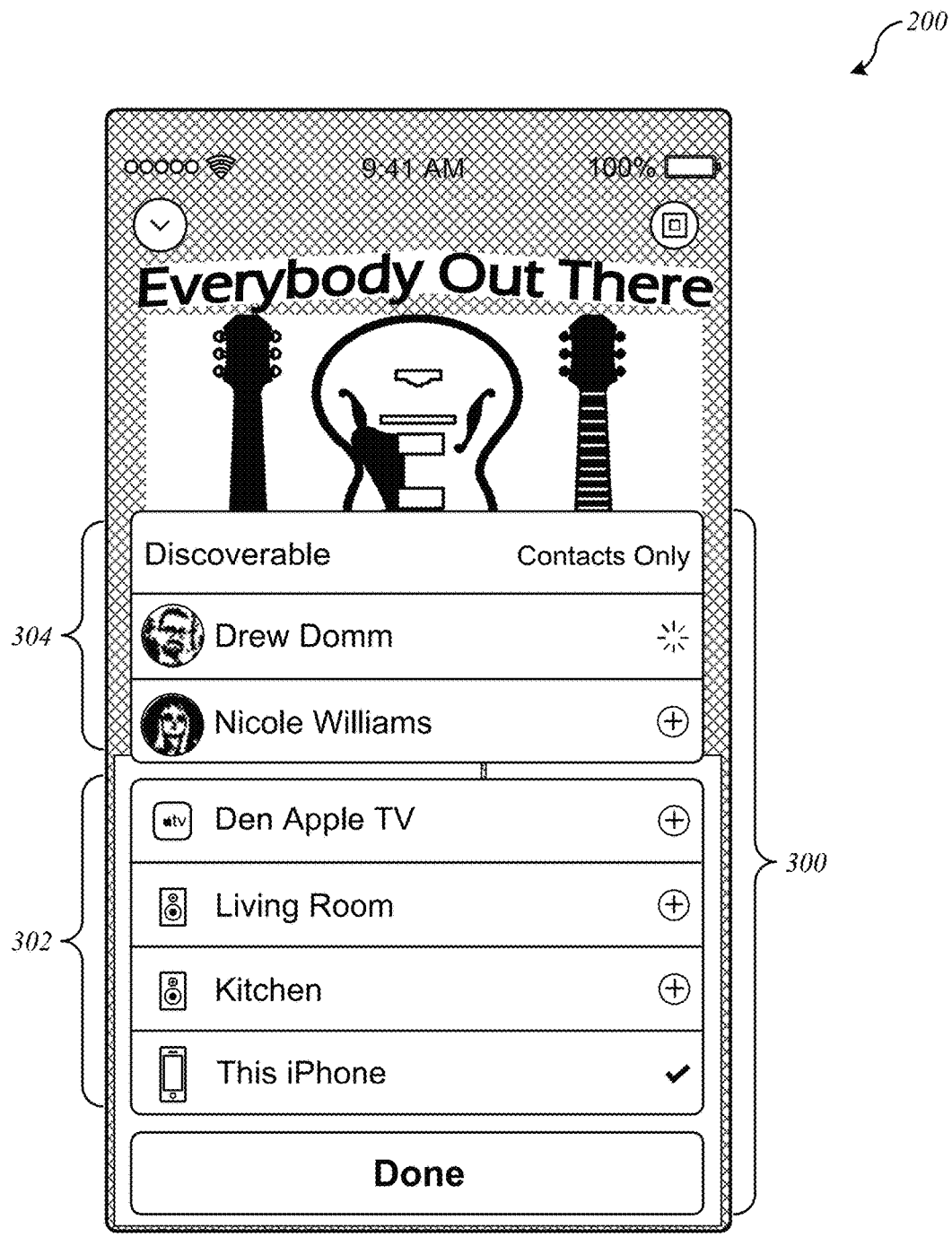
FIG. 3 shows an overlay menu to initiate sharing of a content stream according to an embodiment of the present disclosure.

In some embodiments, now playing screen 200 can provide a sharing control 226. Sharing control 226 can be operated by a user to initiate sharing of the content stream with one or more other users. FIG. 3 shows overlay menu 300 that can appear over screen 200 when the user operates sharing control 226 (e.g., by tapping on it) according to an embodiment of the present disclosure. Menu 300 includes a list of destination devices with which the streamed content can be shared. Devices in section 302 can include other devices belonging to (or controlled by) the same user whose device 106(1) is displaying menu 300, such as speaker systems or the like, to which the user may choose to direct streamed audio (or video if applicable).

Sharing section 304 can display a list of other users who have devices available for sharing the content stream. For example, the listed users can include contacts of the "inviting" user whose device is displaying menu 300, e.g., as determined from a contacts list accessible to user device 106(1)). In some embodiments, the list can be filtered based on which of the user's contacts are subscribers to the streaming media service that is providing the content stream. As another example, the list can include users of streaming media server 102 who have indicated interest in receiving shared content streams (from the inviting user specifically, or more generally), or the like. In some embodiments, the list presented in sharing section 304 can be further filtered based on which of the possible sharing users have a device to which user device 106(1) or streaming media server 102 can currently connect. In this example, two other users have been identified. The inviting user can select one or more other users to share the content stream, e.g., by tapping on the user's name in menu 300. Any number of users can be invited to share a content stream; if desired (e.g., for resource management purposes), the number can be limited by user device 106(1) or server 102.

When an inviting user, operating user device 106(1), selects a second user to share a content stream, user device 106(1) can send an invitation to a user device belonging to the second user (e.g., user device 106(2)), inviting the second user to join. The invitation can include, e.g., an identifier of the first user, information about the content to be shared (e.g., an identifier of the currently playing track, album, playlist, or the like), identifiers of any other users who have been invited to share, or who are currently sharing the stream, any information needed by user device 106(2) to start receiving the shared content stream, and so on. User device 106(1) can send the invitation to user device 106(2) via streaming media server 102, via a local area network connection (if both devices are present and visible on the same local area network), or via any other available communication channel. The invitation may also include specific editing rights that will be afforded to the invited user (e.g., whether the invitee will be able to control playback or other playback controls and/or whether the invitee will be able to edit the shared playlist).

Figure 4:
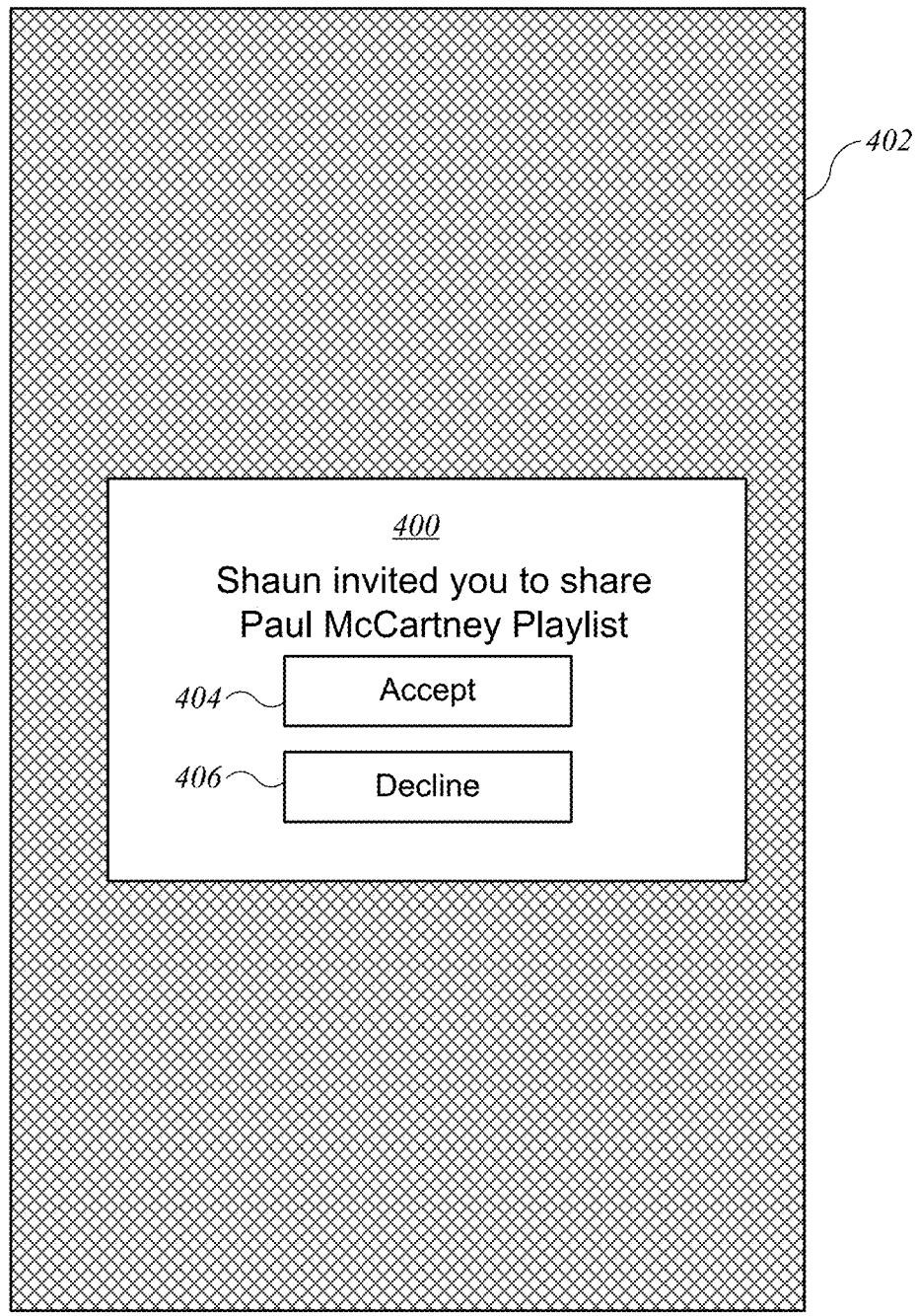
FIG. 4 shows an alert that can be displayed on a user device according to an embodiment of the present disclosure.

When user device 106(2) receives an invitation, user device 106(2) can determine whether to accept. For instance, user device 106(2) can alert the second user to the invitation and prompt the user to accept or decline. FIG. 4 shows an alert 400 that can be displayed by user device 106(2) according to an embodiment of the present disclosure. Alert 400 can appear, e.g., as a pop-up or overlay over other information currently being displayed on display 402 of user device 106(2). Alert 400 can identify the inviting user and the nature of the invitation and can provide user-operable controls to accept (button 404) or decline (button 406) the invitation. If the user accepts, user device 106(2) can notify user device 106(1), via any available communication channel, including via streaming media server 102. In some embodiments, the invitation can include the information needed for user device 106(2) to join the shared content stream and start receiving the shared content. User device 106(2) can communicate with user device 106(1) and/or streaming media server 102 to establish a channel for delivery of streamed content. Thus, user device 106(1) and 106(2) can each receive a shared content stream; any technology for streaming the same content to multiple devices can be used in connection with embodiments described herein.

Figure 5:
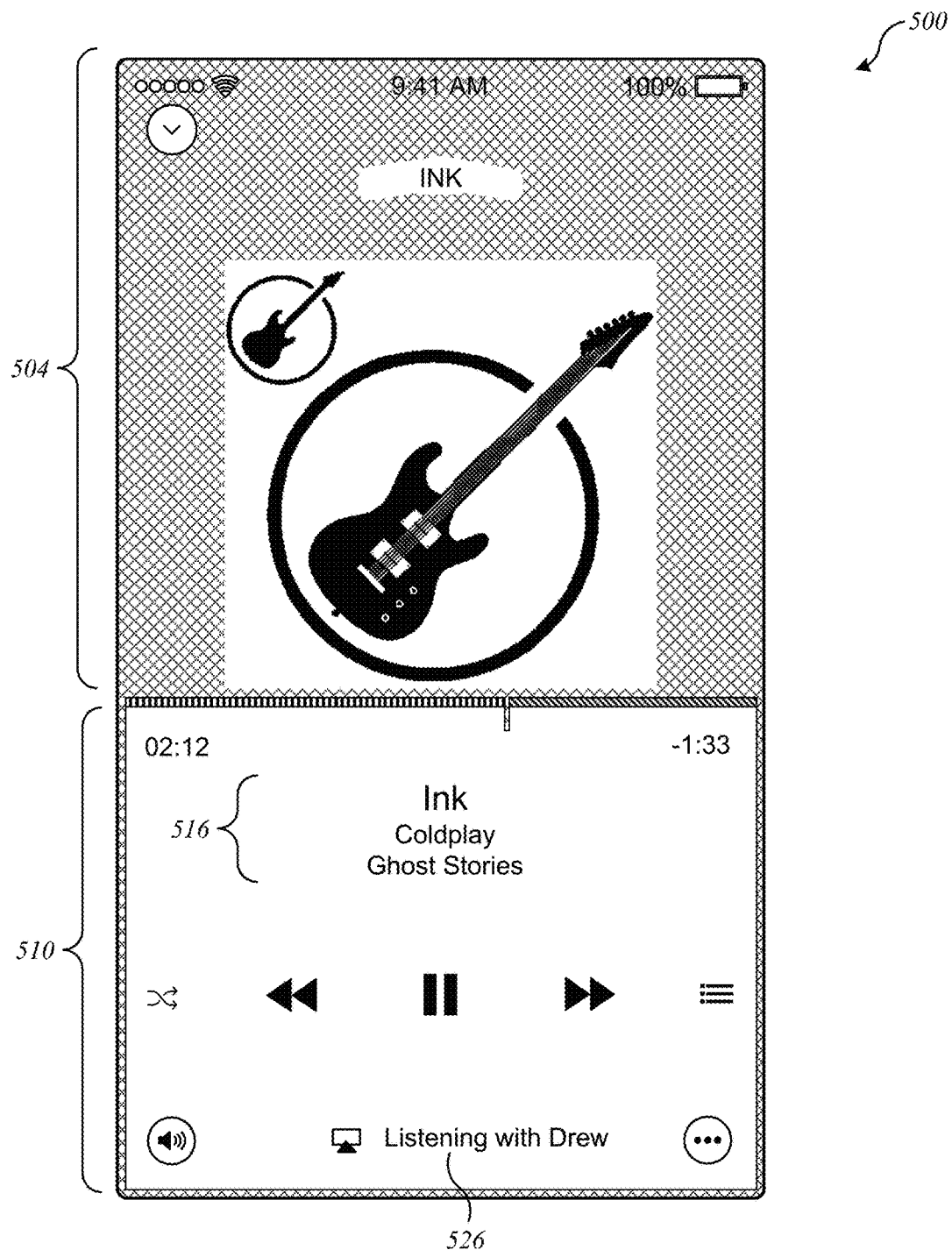
FIG. 5 shows a now playing screen that can be presented on a user device while receiving a shared content stream according to an embodiment of the present disclosure.

FIG. 5 shows a now playing screen 500 that can be presented on a user device while receiving a shared content stream according to an embodiment of the present disclosure. It is to be understood that screen 500 can be presented on an initiating user device (e.g., user device 106(1)) and separately on each other user device that is also receiving the content stream (e.g., user device 106(2)), with appropriate user-specific modifications. (For instance, user Drew's screen would not say "Listening with Drew" but would instead identify the other user.) Screen 500 can be generally similar to screen 200 described above, including both image area 504 and control area 510. In this case, the various control elements in control area 510 can be provided to the extent that they are operable by a particular user. For instance, in some embodiments only the user who initiated sharing has the ability to control the stream, and control elements 216, 218, 220 can be rendered in an "inactive" format (e.g., in a low-contrast color scheme, greyed out, etc.) or not rendered at all for users who do not have the ability to control the stream. However, in some embodiments, all devices sharing the content stream (and/or playlist of content items to be streamed) will have the ability to control the stream. Playback controls (pause, play, skip forward, skip backward, etc.) performed on one user device will control playback on that device as well as the other devices with which the streaming content is being shared. The content across all shared devices will remain synchronized even after and/or during execution of playback control commands.

Sharing control 226 can be presented, e.g., as shown, to identify the other user(s) sharing the content stream. In some embodiments, only the user who initiated the sharing of the content stream can change the sharing settings, e.g., inviting other users, and sharing control 226 can be rendered to indicate that it is inoperative on the screen of any device that is not currently permitted to change the sharing settings. Presentation of an inoperative sharing control 226 can provide a useful indicator that the content stream is being shared (and with whom), and in some embodiments, any user who is sharing a content stream can operate control 226 to stop receiving the shared stream even if the user is not authorized to invite users. For example, one user can stop sharing while any other users continue to share. Other implementations of a sharing control can be used. For example, if given "sharing" rights from the original inviting user, other user devices that are sharing the content stream may invite others to join.

In some embodiments, the playlist can include multiple tracks (e.g., songs or other individual content items or defined segments). Each track may be associated with a different image to be presented in image area 504. When a transition from one track to another occurs, a new track marker 516 can be generated and inserted into now playing screen 504, and the background image can be changed to a new image associated with the new track.

It will be appreciated that the user interface screens described herein are illustrative and that variations and modifications are possible. Screen elements can be rearranged as desired, and different combinations of control elements can be provided depending on the types of control operations that are supported in a particular implementation. A variety of different interface designs can be implemented to allow the user to edit and/or control the shared content stream without leaving the context of the media app that is presenting the shared content stream.

In some embodiments, any content item (or set of related content items) that streaming media server 102 can stream to user devices can be shared using user interfaces similar to those shown. For example, streaming media server 102 can stream a single track, an album, a user-defined (and/or shared) playlist, a curator-defined playlist, a radio station, or any other available content. Depending on implementation, streaming media server 102 may selectively limit or prohibit sharing of certain content streams (e.g., preventing streams containing explicit content from being shared to devices that have blocked explicit content).

Figure 6:
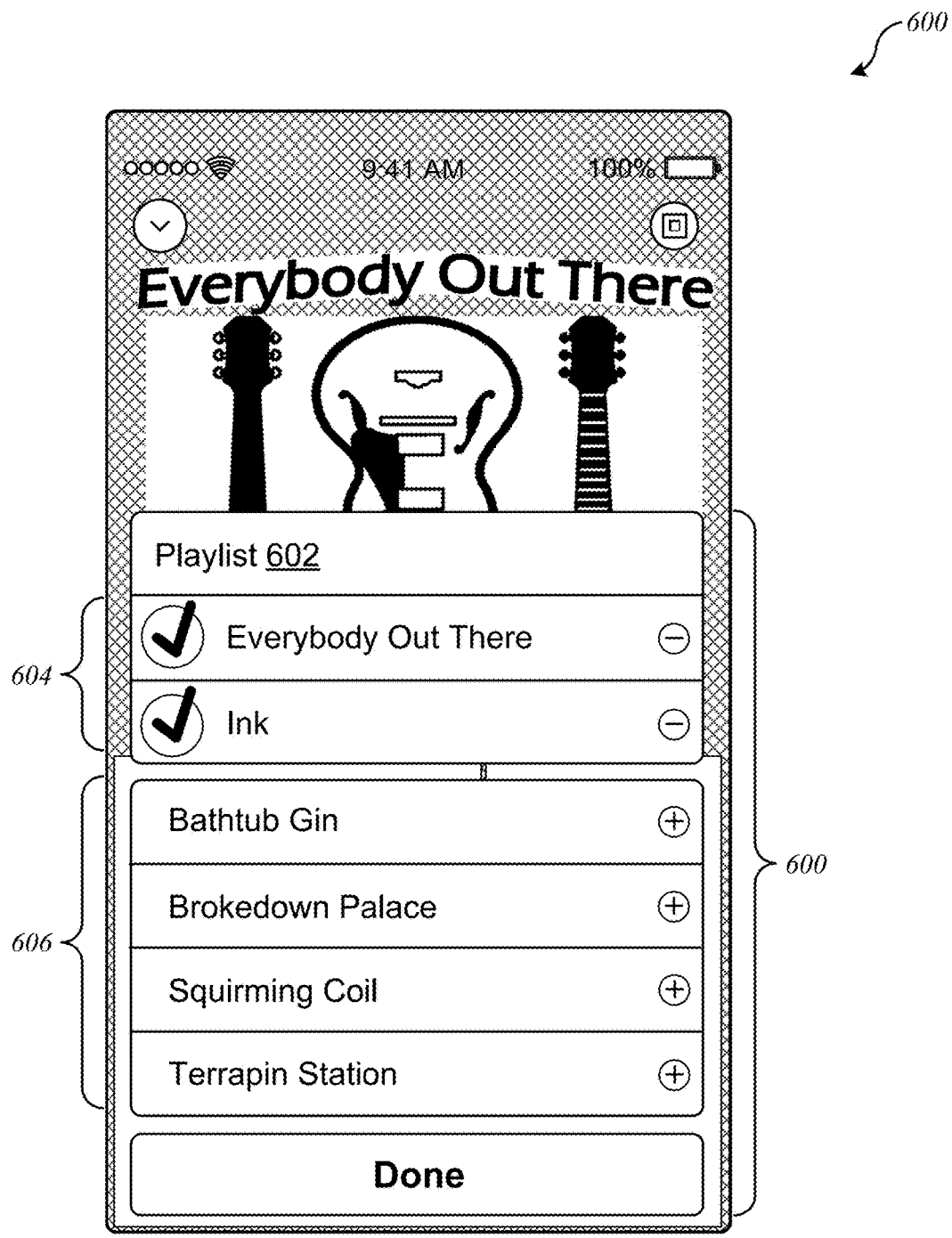
FIG. 6 shows an overlay menu to build or edit a playlist according to an embodiment of the present disclosure.

FIG. 6 shows overlay menu 600 that can appear over a screen when the user operates a playlist control according to an embodiment of the present disclosure. Playlist menu 600 includes playlist 602, a list of songs 604 that have been added to playlist 602, and a list of songs 606 that are available for being added to the playlist 602. A user may add songs to playlist 602 by dragging the songs 606 from the lower section and dropping songs 606 into the upper section. A user may also add songs to playlist 602 by selecting the plus sign next to each title. Conversely, songs may be removed from playlist 602 by dragging and dropping song titles out of the upper section or selecting the minus sign next to each title. Songs 604 in playlist 602 may also be reordered by dragging and dropping or any other know technique. Once playlist 602 has been created and/or edited, the user may select the "Done" button to close menu 600. Playlist 602 may be accessible at any time while the devices are playing content items of playlist 602 and/or may be visible (or at least a portion of it may be visible) while the user is viewing now playing screen 200 of FIG. 2 or any other interface associated with media app 120 of FIG. 1.

Referring back to FIG. 1, in some embodiments, once user device 106(2) accepts an invitation to share a playlist with user device 106(1), the playlist may be stored by streaming media server 102. In some aspects, client devices 106 may then become slaves to server 102 and server 102 may be responsible for maintaining the shared state (e.g., playback state) of the playlist (content stream). In this way, streaming media server 102 be responsible for instructing each device 106 regarding which track of the playlist to play and when. When playback control commands are performed by users of user devices 106, these commands can be transmitted back to streaming media server 102. Streaming media server 102 can then calculate an appropriate next instruction for each device 106 (e.g., whether to pause, play, skip, etc., and at what time).

As noted, streaming media server 102 may maintain a global clock time that can be transmitted to user devices 106 with each instruction or at intervals (periodically, etc.). Maintaining synchronization of devices 106 may be enabled by regular maintenance of the playback state by streaming media server 102 and by synchronization of user device clocks (e.g., within 200 ms accuracy).

In some examples, some tolerance for latency between device playback times may be tolerated. Sometimes, devices may become out of sync and/or lag behind playback of another device with which it is sharing the content stream. In these situations, one device may experience a short interruption in playback of the content, while the device jumps ahead to a location in the playback that will enable a resynchronization of the devices. Instructions to jump ahead may be calculated and provided by streaming media server 102.

Latency issues caused by one of the users performing a playback control may be handled in several different ways. In some cases, the devices 106 may buffer the content items of the playlist such that latency can be resolved locally by instructing the lagging device to start playing the buffered content at a later time than the other device. However, in other examples, for older devices that don't buffer or for devices with poor network connections, the lagging device may be instructed to skip a certain amount of the beginning of the song so that only that listener is affected. Or, the start of the song for each device can be delayed. However, in at least one embodiment, the devices may report back to streaming media server 102 to indicate what content they have locally, and streaming media server 102 can use that information to calculate a delay for each device. The delay can be transmitted to each device, as appropriate.

Some devices 106 may be associated with users or accounts that are configured with age restrictions, language restrictions, content restrictions, or the like. For example, a child may use a device that was provided by a parent, and the parent may have configured the device to only play content that is below a particular age appropriateness level. Some age appropriateness levels may restrict certain words, phrases, sounds, subjects, etc., from being played. Additionally, other restrictions may include user or governmental restrictions on subject matter or language. For example, users in Germany may configure their devices to only play content that includes lyrics or other spoken words in the German language. As such, multiple different versions of content may be stored in catalog 110. For example, an artist may record an explicit track that includes explicit language (cuss words or the like) that may only be appropriate for people above a certain age. If two version of a content item exist (that are of the same length), then synchronization of the first version on one device with the alternate version a different device may not be an issue. The two versions may be played synchronously as if they were the same exact content item. However, if playback properties of the two versions of a single content item are different (e.g., different lengths, different beginnings, etc.), then one of the versions may need to be altered.

Altering of the alternate versions of content items may be performed on the fly (dynamically and/or in response to receiving a request for the alternate version) or may be performed when the original version is added to catalog 110. Additionally, the altering (conversion) to a syncable version (a version that can be synced) may be performed by streaming media server 102 or by conversion app 122 executed on user devices 106. Of course, as desired, in some instances, a user with an age restriction may not be able to join a shared playlist that includes content items that would violate the restriction, or the user with the age restriction may be provided a completely different content item when the violating content is scheduled for streaming by the sharing devices. Another option would be to bleep out the offending portions of the content item as it is being played for the user with the restrictions. While examples have been provided with reference to age restrictions, similar techniques may be employed for content that violates any user or device policy (e.g., explicit content, language, subject matter, etc.).

In some embodiments, devices 106 and the server 102 may maintain a persistent open connection or commands from streaming content server 102 may be pushed to devices 106. The command may be a payload of the push notification, or if the payload is too large to be included in the push notification, the push notification may instruct the device 106 to look to server 102 for the payload. However, in other examples, where a single user (curator of content, radio DJ, etc.) is providing/editing the content of the playlist, the devices 106 may pull commands from server 102 (instead of having server 102 push to potentially hundreds or thousands of devices). The commands may be pulled (or requested) on regular or irregular (occasional) intervals. Additionally, in some examples, playback control commands received by one device may be shared with other devices that are within close proximity of the receiving device. In this way, a device with a better network connection can pass the command from server 102 to the other devices nearby (e.g., using a different, shorter-range radio device, than that which received the command from server 102), presumably providing the command before the other devices would have received them from server 102 directly.

As noted, some versions of songs may be explicit or may be in a particular language (e.g., English). Other versions of the same song may have completely different audio (e.g., without the explicit lyrics or in a different language (e.g., Spanish). Yet, when a playlist of songs is shared across devices, the metadata from the original version (the version associated with the playlist) may be provided to all devices even if different versions of the audio are to be provided. In this way, the track name, length, recording information, album art, etc. may be the same for all devices sharing the content of the playlist, even if different devices will play different versions. The type of audio (clean vs explicit, language one versus language two, etc.) might be considered attributes or properties of the content item. For content that was recorded live, song length and other properties of the content item may be completely different. In some aspects, certain portions of one content item may be cut or revised in some way to enable syncing of the two versions even though their properties are different. In some examples, when a restriction of one device is being applied, the restriction may be dropped by the restricted device when the two devices are within close range of each other (e.g., within the same room or otherwise close enough to share the streaming content over a local network connection). However, one setting of the restrictions (e.g., configured by a parent) may be that the restriction is always enforced, even when two sharing devices are in the same room.

In some embodiments, conversion app 122 or some other application or service may be configured to identify explicit content on the fly (e.g., as the song is being played). When explicit content is detected (while playing or just before playing (e.g., identified in the buffered content before it is played)), user devices with restrictions (using conversion app 122) may be able to bleep or otherwise cover-up the explicit lyrics in the song without affecting the synchronization.

The bleep or cover-up could occur during just the explicit lyrics, for the whole song, for portions of the song, etc. The bleep or cover-up may be a "beep" sound, some other sound that makes the explicit lyrics inaudible, a blank sound, or a muffle of a portion of the audio content that enables the music (or beats) to be audible without the lyrics being audible or at least without the explicit lyrics being understood. In some embodiments, if the song is encoded in a format where the vocal tracks are separate from instrument tracks, only the vocal tracks would need to be covered up (bleeped). Completely different content could also be played on the restricted device for a few seconds while the explicit lyrics are being presented on the unrestricted device. Alternatives to detecting the explicit lyrics on the fly include receiving metadata from artists or some other service that identifies at which moments within a song the explicit lyrics exist. In this way, pre-recorded bleeps or cover-ups could be pre-programmed to be played at the appropriate times based at least in part on the metadata. Regarding a sharing user's ability to control playback of the playlist, control by a restricted user may be blocked temporarily while the explicit song is being played to ensure that the restricted user can't simply skip songs that they cannot play. Another embodiment may include skipping a restricted song for all users, and indicating to the group that the song was skipped because a restricted user cannot listen to that song (the name or user ID of the restricted user may or may not be shared with the group).

As noted, in some examples, server 102 may provide instructions to cut off the beginning or end of an alternate version to enable synchronization of different versions of the same content item. Alternatively, or in addition, server 102 may provide instructions to the device playing the alternate version to slow down or speed up playback of the alternate version in order to enable the synchronization. In other words, as the devices provide playback feedback information to server 102, server 102 may determine that the versions are no longer synchronized. When this happens, server 102 may instruct the device playing the alternate version to adjust the playback speed of the alternate version to allow the songs to sync back up (e.g., by speeding up the alternate version when the alternate version was ahead of the original version or by slowing down the alternate version when the alternate version was behind the original version). Tracks may be slowed down or sped up by small percentages (e.g., from 0.01% to nearly 5%) without the listener noticing. In some embodiments, if the first version and the second version are only off by a few seconds or so, a new total time (e.g., half of the difference in time of the two versions) may be calculated, and the shorter version may be sped up to meet that new total time while the longer version may be slowed down to meet the new total time. However, if the two version are off by more than is reasonable to meet in the middle, certain portions of one version may be cut or redacted from the version, and then that version may be sped up or slowed down to meet the other. Spectral analysis or other techniques for identifying beats within a song may be utilized to identify an intro or an outro of a song that could be cut or reduced. In some embodiments, a particular intro or outro of a song could be sampled, and replayed a few times in order to enable the synchronization as described.

Additional embodiments of the disclosure include accounting for local clock drift. That is, when one of the two devices sharing the streaming content has a crystal (e.g., that controls the internal clock of the device) that is slower or faster than either the clock of server 102 and/or the other clocks of the other sharing devices. The problem with local clock drift is two-fold. One, if the local clock of one device drifts from that of the global clock (e.g., it is running at a slightly different rate), then the instructions to play, pause, skip, etc., at the global clock time will not actually cause the device to perform the action at the appropriate time (e.g., it may think it is starting at the instructed time, but the local clock may have drifted from that of server 102 since the last instruction). Second, if the local clock drifts from that of other devices, the drifted device may think it is synchronized with the other devices, which it may not actually be.

One solution to local clock drift is to poll server 102 for the global clock every few seconds and ensure that the local time is passing at the same rate as that of server 102. If local drift is detected, the content being played by the drifting device may be slowed down or sped up to compensate. The rate of change of the playback speed may be constant if the drift is constant; however, it is possible for the drift rate to change, in which case the playback rate may need to be revised every once in a while. Sample rate conversion of the content being played by the drifting computer may also be employed to compensate for the drift.

In some embodiments, the intros, verses, bridges, choruses, and/or outros of songs could be tagged (and stored in the metadata). Based at least in part on the tags, the songs could be synchronized such that each tag is played at the same time on the different devices, and various conversion/revision techniques could be used to speed up or slow down playback of each version to ensure that the tagged portions (verses, choruses, bridges, etc.) were played at the same time. Again, a global clock time of server 102 may be provided at each moment that a tagged portion of alternate versions is to be played. Some of the metadata of each song (which could be different for each version) may include markers and/or other information that maps the version of the song to a timeline. That way, when the two versions are played, certain portions of each version could synced such that respective portions of each version will line up with the timeline at the same time. This metadata could be pre-computed for each version of a song such that when a song is requested form server 102, the appropriate version (based at least in part on restrictions/rules of the receiving device) can be shipped with the mapping/timeline information. Each device may be configured to speed up and/or slow down their respective versions at different times during playback such that the mappings is consistent with the timeline for each song.

Figure 7:
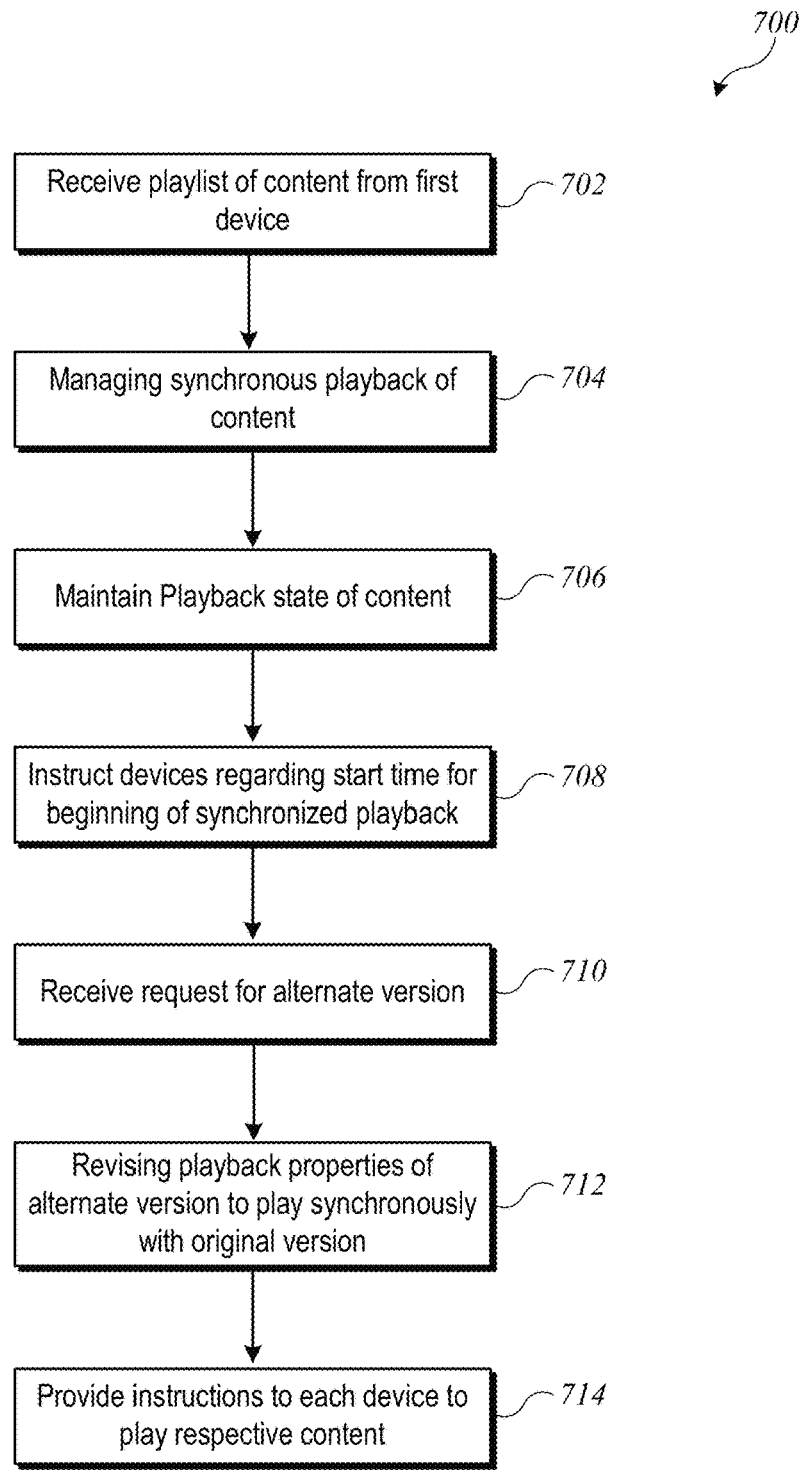
FIG. 7 shows a flow diagram of a process for sharing a content stream with alternate versions of synchronized content according to an embodiment of the present disclosure.

Referring first to FIG. 7, process 700 can begin at block 702 when server 102 can receive a playlist of content from a first device of a plurality of devices. The playlist may include content that has multiple versions (e.g., an original version and an alternate version). Each of the many different versions may have different playback properties. Playback properties may include the language of the lyrics, a subject matter of the content, a length of the content, a bit rate or playback rate of the content, or the like. At block 704, server 102 can manage synchronous playback of the content of the playlist. Managing synchronous playback of the content may include identifying the content in data stores and preparing to stream the first content item of the playlist to at least the first device. The management may also include identifying appropriate metadata and/or calculating appropriate start times for each device. Appropriate start times may be determined based at least in part on network connection signal strength, latency, etc., associated with each device. At block 706, a playback state of the content may be managed. Managing the playback state of the content may include storing information about a currently playing content item, a start time for when the playing item was started, and/or an amount of the content item that has been streamed to and/or presented by the devices.

At block 708, server 102 can instruct the respective devices regarding a global start time for beginning synchronized playback of the content. The start time may correspond to a first content item or it may correspond to the next start time for a next content item and/or a new instruction based at least in part on a playback control command received from a user device. At block 710, server 102 may receive a request for an alternate version of the content item. The request may come from one of the sharing devices. The request may be based on a policy or restriction placed on the device that is requesting the alternate version. Policies or restrictions may be based on age restrictions, language restrictions, governmental restrictions, intellectual property rights restrictions, etc. At block 712, server 102 may revise playback properties of the alternate version to ensure that the alternate version will be able to be played synchronously with the original version. The revision may include shortening or lengthening the content item, chopping off or adding additional segments of the content item, including tags or other indicators in the metadata that the content item should be played faster or slower during different portions, providing instructions to fade in or fade out of previously playing songs, etc. In some examples, the playback properties may actually be revised at the user device as opposed to at server 102. However, server 102 may also be responsible for revising the alternate version (e.g., on the fly). At block 714, server 102 can provide instructions to each device regarding synchronously playing the multiple versions of the content item at each device.

It will be appreciated that process 700 is illustrative and that variations and modifications are possible. Steps described as sequential may be executed in parallel, order of steps may be varied, and steps may be modified, combined, added, or omitted. In some embodiments, a user may be able to select a subset of sharing users to receive a particular playlist, and the playlist would be sent only to the selected users. As another example, sending and receiving of playlists in connection with a shared content stream may be limited to users who have accounts with server 102; users who do not have such accounts may be able to share the content stream but not edit the playlist. In some instance a user may be receiving the shared content stream on a device that limits participation in playlist editing. For example, a particular device (e.g., a TV with a set-top box) may be able to receive playlists and/or present content items but may not provide an interface for editing playlists. Further, sharing of content streams can be limited to users who are subscribers of a streaming media service.

In some embodiments, any user can join or leave a shared content stream at any time, and this need not disrupt the experience for other users. If a user joins or leaves a stream, the devices of the other sharing users can be notified, so that any new playlists can be routed to all users (and only those users) who are sharing the content stream at the time the new playlist is sent. In addition, the devices of the other sharing users may display notifications indicating when users join or leave.

In some examples, in response to user selection of a play control, messaging app 122 can generate a play request to media app 120. The play request can include at least a tag field, which can identify a track and a playback position. Based on this information, media app 120 can stream the track (e.g., by communicating with streaming media server 102) or a portion thereof. For example, media app 120 can begin the playback five or ten seconds before the playback position indicated in the tag and can fade in the audio so that full volume is reached at the playback position indicated in the tag. Depending on implementation, media app 120 can play back a fixed-length segment of the track, e.g., the next 30 seconds after the playback position; continue playing until a playback position associated with the next content item in the playlist; or continue playing to the end of the track. Further, in some embodiments, the user can select play control 1220 for a session marker to replay the entire shared content stream from the beginning, in which case media app 120 can begin playback with the first track that was shared. (The ability to replay an entire stream may depend on whether relevant history information is available to media app 120.)

It will be appreciated that formats used to display playlists and associated interface controls (e.g., play controls) can be varied as desired. In some embodiments, a review of a previously shared content stream can be initiated from within media app 120. For example, media app 120 may store information identifying previously shared content streams and may present a stream-replay selection interface to the user based on the stored information.

Other variations and modifications will also be understood in light of the present disclosure. For example, some user devices may have a locked state, from which the user is required to enter a passcode or other access credential to unlock the full user interface and interact with the device. In some embodiments, a now playing screen can be presented on a "lock screen" that is displayed while the device is in a locked state. In some embodiments, the user may enable privacy settings to prevent information from being displayed while the device is in the locked state, and the information display process can respect the user's privacy settings, only displaying information where the privacy settings indicate that information should be displayed. Where information is not displayed on the lock screen, the device can present notifications indicating that information has been received and can present the content in response to the user unlocking the device.

Further, while streaming audio is used as an example, playlists as described herein can be used in connection with streaming of any type of content to multiple users. Thus, for example, users may share a video stream (e.g., one they recorded) as they watch. Users may share a stream of an audio book and may pause the playing of the audio book or any other digital content.

In still other embodiments, playlists can be associated with a collaborative user activity that involves a two-way (or multi-way) data exchange. For example, two or more users may be collaboratively editing the playlist. For example, the playlist may be hosted on a server that receives change reports from one device and propagates them to others. Peer-to-peer collaboration technology may also be used. Such scenarios differ from "streaming," in part in that communication of content is two-way (or multi-way): changes made to the playlist by one user should be propagated to other users in approximately real time. Regardless of the particular technology or transmission path, it is assumed that changes made at one user device can be propagated to the others together with time stamps. Accordingly, playlist information sent between the users can be propagated with "collaboration-relative" time stamps derived from the timestamps of the changes. The user devices in this context can provide a channel for user communication that is separate from the playlist, with the collaboration-relative time stamps providing a connection between specific information and specific changes. A user interface can allow the user to see the playlist in one integrated view. In some embodiments, a user can replay the editing session, including the changes and playlist, using techniques akin to those described above. For instance, a change log from the collaborative editing session can be time-correlated with the playlists using the collaboration-relative timestamps.

Computer Implementation

Figure 8:
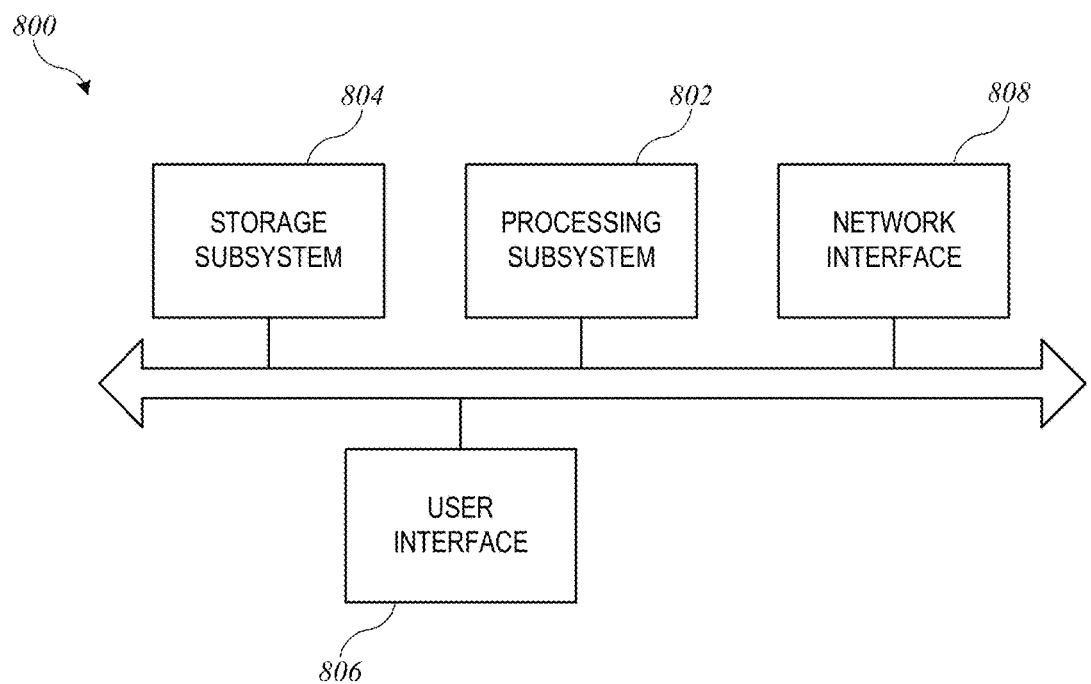
FIG. 8 shows a simplified block diagram of a computer system according to an embodiment of the present disclosure.

FIG. 8 shows a simplified block diagram of a computer system 800 according to an embodiment of the present disclosure. In some embodiments, computer system 800 can implement any or all of the functions, behaviors, and capabilities described herein as being performed by a user device (including user devices 106 of FIG. 1), as well as other functions, behaviors, and capabilities not expressly described. In some embodiments, another physical instance of computer system 800 can implement any or all of the functions, behaviors, and capabilities described herein as being performed by a server (including streaming media server 102 of FIG. 1).

Computer system 800 can include processing subsystem 802, storage subsystem 804, user interface 806, and network interface 808. Computer system 800 can also include other components (not explicitly shown) such as a battery, power controllers, and other components operable to provide various enhanced capabilities. In some embodiments, computer system 800 can be implemented in a consumer electronic device such as a desktop or laptop computer, tablet computer, smart phone, other mobile phone, wearable device, media device. household appliance, or the like. Computer system 800 can also be implemented in a large-scale architecture such as a scalable server system or server farm that can include many interconnected processors, storage systems, and interfaces, capable of processing and responding to high volumes of requests from client devices (including user devices).

Storage subsystem 804 can be implemented, e.g., using disk, flash memory, or any other non-transitory storage medium, or a combination of media, and can include volatile and/or non-volatile storage media. In some embodiments, storage subsystem 804 can store one or more application and/or operating system programs to be executed by processing subsystem 802, including programs to implement any or all operations described herein as being performed by a user device. For example, storage subsystem 804 can store media app 120 and messaging app 122 of FIG. 1 and associated data (e.g., a local media library). In instances where computer system 800 implements a server, storage subsystem 804 can be implemented using network storage technologies and/or other technologies that can manage high-volume requests to large data stores. For example, storage subsystem 804 can store and manage catalog repository 110 and user account information repository 112. Depending on implementation, the various repositories can be physically or logically distinct.

User interface 806 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). In some embodiments, a user can operate input devices of user interface 806 to invoke the functionality of computer system 800 and can view and/or hear output from computer system 800 via output devices of user interface 806. For example, all of the user interface screens described above can be rendered on a touchscreen display, and the user can provide input by touching appropriate areas of the touchscreen. Graphical user interfaces can also be rendered using a display screen and a pointing device (e.g., a mouse) that allows the user to control the position of an on-screen cursor; the user can position the cursor and press a button or tap a touch-sensitive surface to make a selection. In instances where computer system 800 implements a server, user interface 806 can be remotely located with respect to processing subsystem 802 and/or storage subsystem 804.

Processing subsystem 802 can be implemented using one or more integrated circuits, e.g., one or more single-core or multi-core microprocessors or microcontrollers, examples of which are known in the art. In operation, processing subsystem 802 can control the operation of computer system 800. In various embodiments, processing subsystem 802 can execute a variety of programs in response to program code and can maintain multiple concurrently executing programs or processes. At any given time, some or all of the program code to be executed can be resident in processing subsystem 802 and/or in storage media such as storage subsystem 804.

Through suitable programming, processing subsystem 802 can provide various functionality for computer system 800. For example, where computer system 800 implements user device 106, processing subsystem 802 can implement various processes (or portions thereof) described above as being implemented by a user device. Processing subsystem 802 can also execute other programs to control other functions of computer system 800, including programs that may be stored in storage subsystem 804. Where computer system 800 implements streaming media server 102, processing subsystem 802 can implement operations including streaming of content, generating page data for rendering various pages, performing searches within catalog repository 110, and so on.

Network communication interface 808 can provide voice and/or data communication capability for computer system 800. In some embodiments, network communication interface 808 can include radio frequency (RF) transceiver components for accessing wireless data networks (e.g., using data network technology such as 3G, 4G/LTE, IEEE 802.11 family standards (e.g., Wi-Fi network technology), or other mobile communication technologies, or any combination thereof), components for short-range wireless communication (e.g., using Bluetooth and/or Bluetooth LE standards, NFC, etc.), and/or other components. In some embodiments, network communication interface 808 can provide wired network connectivity (e.g., Ethernet) in addition to or instead of a wireless interface. Network communication interface 808 can be implemented using a combination of hardware (e.g., driver circuits, antennas, modulators/demodulators, encoders/decoders, and other analog and/or digital signal processing circuits) and software components. In some embodiments, network communication interface 808 can support multiple communication channels concurrently, using the same transport or different transports.

It will be appreciated that computer system 800 is illustrative and that variations and modifications are possible. User devices implemented using computer system 800 can be portable or non-portable as desired, and any number of user devices can communicate with a streaming media server. User devices and/or streaming media servers can have functionality not described herein (e.g., a user device may provide voice communication via cellular telephone networks; control mechanisms and/or interfaces for operating an appliance such as a thermostat or door lock; ability to interact with the user to provide personal information, play games, access content via the wireless network and/or locally stored content; etc.), and implementations of these devices and servers can include components appropriate to such functionality.

Further, while a computer system is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. For instance, many of the examples in the foregoing description refer to streaming of music. It is to be understood that playlist editing/sharing can also be used in connection with other types of streaming media services, such as services that provide access to movies, TV programs, games or other apps, books, and any other form of media content, and/or with interactive content services such as collaborative document editing. In some embodiments, any user (or any subscriber to a particular streaming service) can initiate sharing of a content stream with one or more other users. Sharing can be initiated at any time, e.g., before or while streaming content. User devices can join in response to an invitation (e.g., from the initiating use or from other users if permitted by a given implementation) at any time. Some embodiments may allow user devices to discover and request to join an in-progress stream with another user; the initiating user's device can be notified and can determine whether to grant the request. While a content stream is being shared, additional users can be invited at any time (by the initiating user or by other users, depending on implementation) and/or users can "drop off" the shared stream by disconnecting their own devices from the stream; a user that drops off can be invited to rejoin. In some embodiments, the sharing of the stream among other users need not end just because one user drops off, although some implementations may provide that a shared stream ends if the initiating user drops off. Control over the stream can be restricted to the initiating user or shared among multiple users as desired. In some embodiments, the initiating user may be able to hand off control to another user, and this may allow the initiating user to drop out without ending the stream for other devices that are still sharing. Thus, a given stream can be shared or unshared at any time.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A non-transitory computer-readable storage medium having stored thereon program instructions that, when executed by one or more processors in a client device, cause the one or more processors to perform operations comprising:
    receiving, at the client device, a shared content stream that is shared with one or more other client devices;
    presenting, at the client device, the shared content stream at a first same time that the shared content stream is presented by the one or more other client devices; and
    while the shared content stream is presented at both the client device and the one or more other client devices:
        identifying original content within the shared content stream that does not comply with a policy associated with the client device; and
        presenting, at the client device, a revised version of the original content at a second same time that a corresponding portion of the original content is presented by the one or more other client devices.

2. The non-transitory computer-readable storage medium of claim 1, further comprising receiving, from a server computer, an instruction, provided by at least one of the one or more other client devices, to control playback of the shared content stream.

3. The non-transitory computer-readable storage medium of claim 2, wherein the instruction comprises a control signal configured to pause, play, skip forward within, or skip backward within the shared content stream.

4. The non-transitory computer-readable storage medium of claim 2, further comprising adjusting the presentation of the revised version of the identified content based at least in part on the instruction.

5. The non-transitory computer-readable storage medium of claim 1, wherein the content comprises an audio file or a video file.

6. The non-transitory computer-readable storage medium of claim 1, wherein the first same time comprises a first time within the identified content.

7. The non-transitory computer-readable storage medium of claim 6, wherein the second same time comprises a second time within the identified content.

8. The non-transitory computer-readable storage medium of claim 1, wherein the original content comprises a word or a phrase of an audio file or a video file that is part of the shared content stream.

9. A method, comprising:
    receiving, by a client device, a shared content stream that is shared with one or more other client devices;
    presenting, by the client device, the shared content stream at a first same time that the shared content stream is presented by the one or more other client devices; and
    while the shared content stream is presented at both the client device and the one or more other client devices:
        identifying, by the client device, original content within the shared content stream that does not comply with a policy associated with the client device; and
        presenting, by the client device, a revised version of the original content at a second same time that a corresponding portion of the original content is presented by the one or more other client devices.

10. The method of claim 9, further comprising receiving, from a server computer, an instruction, provided by at least one of the one or more other client devices, to control playback of the shared content stream.

11. The method of claim 10, wherein the instruction comprises a control signal configured to pause, play, skip forward within, or skip backward within the shared content stream.

12. The method of claim 10, further comprising adjusting the presentation of the revised version of the identified content based at least in part on the instruction.

13. The method of claim 9, wherein the content comprises an audio file or a video file.

14. The method of claim 9, wherein the first same time comprises a first time within the identified content.

15. The method of claim 14, wherein the second same time comprises a second time within the identified content.

16. The method of claim 9, wherein the original content comprises a word or a phrase of an audio file or a video file that is part of the shared content stream.

17. A client device, comprising:

a memory; and one or more processors coupled to the memory, the one or more processors configured to execute instructions to:

receive a shared content stream that is shared with one or more other client devices;

present the shared content stream at a first same time that the shared content stream is presented by the one or more other client devices; and while the shared content stream is presented at both the client device and the one or more other client devices:

identify original content within the shared content stream that does not comply with a policy associated with the client device; and present a revised version of the original content at a second same time that a corresponding portion of the original content is presented by the one or more other client devices.

18. The client device of claim 17, wherein the one or more processors are configured to further execute the instructions to receive, from a server computer, an instruction, provided by at least one of the one or more other client devices, to control playback of the shared content stream.

19. The method of claim 18, wherein the instruction comprises a control signal configured to pause, play, skip forward within, or skip backward within the shared content stream.

20. The method of claim 18, wherein the one or more processors are configured to further execute the instructions to adjust the presentation of the revised version of the identified content based at least in part on the instruction.

21. The method of claim 17, wherein the original content comprises an audio file or a video file.

\* \* \* \* \*